(12) United States Patent
Brown et al.

(10) Patent No.: US 6,673,184 B1
(45) Date of Patent: *Jan. 6, 2004

(54) TIRE AND METHOD FOR CORRECTING TIRE UNIFORMITY THEREOF

(75) Inventors: Robert Walter Brown, Medina, OH (US); Paul Harry Sandstrom, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/510,859

(22) Filed: Feb. 23, 2000

(51) Int. Cl.$^7$ .................... B29D 30/06; B29D 30/30; B29D 30/38; B60C 1/00; B60C 9/02

(52) U.S. Cl. ............... 156/133; 152/564; 152/123; 152/135; 264/501

(58) Field of Search ............... 152/564; 156/110.1, 156/123, 133, 135; 264/501, 502, 326, 328.3

(56) References Cited

U.S. PATENT DOCUMENTS

| | | | |
|---|---|---|---|
| 2,963,737 A | | 12/1960 | Soderquist |
| 3,016,320 A | * | 1/1962 | Bechadolph ............... 156/123 |
| 3,039,839 A | | 6/1962 | Waters et al. |
| 3,389,193 A | | 6/1968 | Hughes |

(List continued on next page.)

FOREIGN PATENT DOCUMENTS

| | | | |
|---|---|---|---|
| CN | 1148003 A | * | 4/1997 |
| EP | 0420333 A1 | | 4/1991 |
| EP | 0522468 A1 | | 1/1993 |
| EP | 0888872 A2 | | 1/1999 |
| EP | 1023987 A2 | | 8/2000 |
| EP | 1 127 681 A2 | * | 8/2001 |
| EP | 1207036 A2 | | 5/2002 |
| EP | 1207037 A2 | | 5/2002 |
| JP | 11198617 A | * | 7/1999 |
| WO | WO98/05937 | | 2/1998 |
| WO | WO99/16630 A1 | | 4/1999 |
| WO | WO00/11445 | | 3/2000 |

*Primary Examiner*—Adrienne C. Johnstone
(74) *Attorney, Agent, or Firm*—Howard M. Cohn

(57) ABSTRACT

According to the invention, a pneumatic tire and method of manufacturing the pneumatic tire having improved tire uniformity characteristics is disclosed. The carcass reinforcement ply has a plurality of reinforcement cords embedded in a matrix material that can be rendered plastic and non-plastic to, respectively, permit and restricts reorientation of the reinforcement cords after the tire has been at least partially vulcanized. The method includes the steps of rendering the matrix material plastic, reorienting one or more reinforcement cords without their being stretched beyond their elastic limits, and then rendering the matrix material non-plastic. The reorientation can occur while the tire is still in the tire mold or when the tire is still hot from the tire mold and at a temperature of at least the deflection temperature by applying a force for reorienting the reinforcement cords.

11 Claims, 6 Drawing Sheets

U.S. PATENT DOCUMENTS

| | | |
|---|---|---|
| 3,464,264 A | 9/1969 | French |
| 3,529,048 A | 9/1970 | Kovac et al. |
| 3,529,148 A | 9/1970 | Stefano et al. |
| 3,632,701 A | 1/1972 | Devitt et al. |
| 3,635,610 A | 1/1972 | Hall et al. |
| 3,725,163 A | 4/1973 | Hofelt, Jr. |
| 3,739,533 A | 6/1973 | Iida et al. |
| 3,838,142 A | 9/1974 | Hochstein |
| 3,848,368 A | 11/1974 | Toshioka et al. |
| 3,865,527 A | 2/1975 | McGehee et al. |
| 3,872,208 A | 3/1975 | Brown et al. |
| 3,880,556 A | 4/1975 | Brown et al. |
| 3,916,969 A * | 11/1975 | Auerbach et al. ....... 156/133 X |
| 3,945,277 A | 3/1976 | McGehee et al. |
| 3,946,527 A | 3/1976 | Beer |
| 3,948,004 A | 4/1976 | Gruber |
| 4,095,374 A | 6/1978 | Ugo |
| 4,171,641 A | 10/1979 | Landsness |
| 4,173,850 A | 11/1979 | Gormish et al. |
| 4,420,453 A | 12/1983 | Ayers |
| 4,458,451 A | 7/1984 | Rogers et al. |
| 4,458,526 A | 7/1984 | Doi et al. |
| 4,536,054 A | 8/1985 | Wallner et al. |
| 4,654,253 A | 3/1987 | Brown et al. |
| 4,736,546 A | 4/1988 | Ugo |
| 4,763,468 A | 8/1988 | Brown et al. |
| 4,790,365 A | 12/1988 | Sandstrom et al. |
| 5,022,186 A | 6/1991 | Rogers, Jr. |
| 5,058,647 A | 10/1991 | Gartland et al. |
| 5,060,510 A | 10/1991 | Rousseau |
| 5,103,669 A | 4/1992 | Kato |
| 5,365,781 A | 11/1994 | Rhyne |
| 5,407,521 A | 4/1995 | Falvard |
| 5,458,176 A | 10/1995 | Rhyne |
| 5,616,859 A | 4/1997 | Rhyne |
| 5,639,962 A | 6/1997 | Maloney |
| 5,660,656 A | 8/1997 | Herbelleauu et al. |
| 5,756,589 A | 5/1998 | Sandstrom et al. |
| 5,901,863 A | 5/1999 | Riga et al. |

* cited by examiner

TIRE AND METHOD FOR CORRECTING TIRE UNIFORMITY THEREOF

TECHNICAL FIELD OF THE INVENTION

The invention relates to correcting uniformity characteristics of a pneumatic tire, without grinding.

BACKGROUND OF THE INVENTION

PNEUMATIC TIRES

FIGS. 1A and 1B illustrate an exemplary pneumatic tire 100 of the prior art. The tire 100 includes a pair of annular, substantially inextensible beads 102 and 104, each of which is disposed within a respective bead portion 106 and 108 of the tire 100, a generally cylindrical tread portion 110, a relatively inextensible belt structure ("belts") 112 disposed within the tread portion 110, and sidewall portions 114 and 116 extending between opposite sides 110a and 110b of the tread portion 110 and respective ones of the bead portions 106 and 108. The tire 100 has a section height SH measured from an edge of the bead portion 106 (or a nominal rim diameter) to an outer diameter of the tread portion 110. The tire 100 has an inner surface 118 and an outer surface 119. An inner liner (not shown) is typically disposed on the inner surface 118 of the tire 100.

At least one carcass reinforcing member 120 (also referred to as a "ply") extends between the two beads 102 and 104, within the carcass of the tire 100. The ply 120 has a central (middle) portion 120a which is disposed between the two beads 102 and 104, and has two opposite end portions ("turn-up" ends) 120b and 120c, each of which wrap around a respective one of the beads 102 and 104 and extend radially back towards the tread portion 110 of the tire 100. The tire 100 further typically includes bead filler apexes 122 and 124 disposed atop respective ones of the beads 102 and 104 and extending radially outwardly therefrom.

The tire 100 has an axis of rotation (not shown), an outer diameter which is twice (2x) a radius dimension between the axis of rotation and the tread surface, and an inner diameter which is (2x) the radius dimension between the axis of rotation and an inner edge of the bead portion. An equatorial plane "EP" for the tire 100, is defined as a plane which is perpendicular to the tire's axis of rotation and passing through the center of the tread portion 110, or midway between the tire's beads 102 and 104. A radial direction (orientation) is indicated by the arrow 130, and a lateral (or axial) direction (orientation) is indicated by arrows 132.

The at least one ply 120 of the tire is at least one layer of rubber-coated ply cords. Ply cords are typically formed of cotton, rayon, nylon, polyester or other man-made synthetic or textile cord which are capable of exhibiting permanent changes in physical properties upon application of load or heat, or of fiber glass, metal wire or the like, the physical properties of which are relatively non-changeable upon application of load or heat. Commonly-owned U.S. Pat. No. 4,654,253 (Brown, et al.; 1987) and U.S. Pat. No. 4,763,468 (Brown, et al.; 1988) disclose high strength greige woven fabrics particularly suitable for use as a tire reinforcement component, wherein a cord may comprise at least two optimally drawn polymeric yarns.

Generally, there are three basic types of pneumatic tires—"bias", "bias/belted" and "radial"—each type essentially being defined by the orientation of the cords within the at least one ply (120).

In the bias (or "cross-ply") tire, the cords of the reinforcing ply extend diagonally across the tire from bead-to-bead, typically at an angle of between 25 and 40 degrees with respect to a centerline of the tire. The cords run in opposite directions in each successive reinforcing ply layer, resulting in a crisscross pattern of cords.

In the bias/belted tire, as in the bias tire, the cords extend diagonally across the tire, from bead-to-bead, typically at an angle of between 25 and 45 degrees with respect to the centerline of the tire, and the cords run in opposite directions in each successive ply. A cord-reinforced "belt" structure is disposed in the tread portion of the tire, and the belt cords typically have an angle of between 20 and 35 degrees with respect to the equatorial plane of the tire.

In the radial tire, the plies of reinforcing cords are parallel and extend transversely from bead-to-bead. That is, the parallel cords are substantially perpendicular to the direction of tire travel.

A cord-reinforced belt structure is disposed in the tread portion of the tire, and is composed of several layers of cords disposed nearly parallel (10 to 30 degrees) to the circumference of the tire. The belt structure acts to restrict the reinforcing plies. Increased sidewall bulging is characteristic of radial tires.

TIRE MANUFACTURING PROCESS

As is disclosed in commonly-owned European Patent Application Publication No. 0 522 468 A1 (published Feb. 13, 1993), in a typical tire manufacturing process, an inner liner is disposed on a generally cylindrical tire building drum (or mandrel). At least one carcass reinforcing member ("ply", compare 120) is disposed over the inner liner. Next, bead rings (compare 102, 104) are disposed over the reinforcing ply, and apex rubber (compare 122, 124) is applied over the beads. Next, a turn-up bladder or the like, such as is disclosed in U.S. Pat. No. 5,407,521 (Falvard; 1995), is activated to turn-up the two opposite end portions (compare 120b, 120c) of the ply (and, optionally, the inner liner) around the bead rings. Next, sidewall rubber is added, and the resulting tire "carcass" is shaped into what is generally its ultimate toroidal form. Tread rubber and, optionally, belts or breakers and chafers, may then be added to the construction, and the resulting "green" tire can be inserted into a mold wherein it is heated for a period of time (e.g., approximately 10–30 minutes) at an elevated temperature (e.g., at least approximately 120 degrees Celsius, such as approximately 150 degrees Celsius) to "cure" or "vulcanize" the rubber components of the green tire. During the molding process, tread patterns are typically impressed into the tread rubber, and designs, lettering and the like may be formed in the sidewall rubber of the tire. In some cases, tires are retained in the mold until they have become substantially cooled down. More often, tires are removed from the mold without a cooling period, and are allowed to cool down (e.g., to ambient temperature) outside of the mold. Rubber is a poor conductor of heat and the thick tread portion of the tires continue to vulcanize for a period after removal from the molds.

UNIFORMITY CHARACTERISTICS

After a tire is assembled and at least partially cured, the tire is typically tested for one or more uniformity characteristics. "Uniformity" is defined herein as what a "perfect" or "ideal" tire would yield for a certain measured characteristic when tested during rotation. "Uniformity characteristic" is defined herein as a deviation in those certain characteristics from what the perfect tire would yield during testing.

As is evident, the pneumatic tire is a somewhat complicated construction of various materials which is difficult to manufacture with perfect consistency, from tire-to-tire. inconsistencies in materials, in the placement of the materials on the building drum, and other process variables will contribute to both dimensional and dynamic variations, from tire-to-tire.

Generally, a dimensional non-uniformity is a deviation from perfect roundness of the outer circumference of the tire (alternatively, the outer circumference of the tire being round, but off-center with respect to the tire's axis of rotation), and a dynamic non-uniformity is a condition which manifests itself in the tire's ability to react forces at different orientations of the tire.

Sources of such tire non-uniformities may include one or more of the following:

a. The tread, sidewall and innerliner are stored on long rolls in the "green" state and are assembled into a tire in the green state. While in the green state, during storage and tire building, rubber can deform. Therefore, the green rubber tire components may not remain uniformly thick before curing.

b. The beads may deform non-uniformly, since they incorporate a green rubber matrix and are held in position by a deformable green rubber matrix.

c. Before curing, the position of the ply within the tire is fixedly held by the surrounding green rubber. If the green rubber deforms, the ply's position may be displaced.

d. Where the ply is spliced (overlapped on the build drum), it is doubled over itself, and stiffer than the remainder of the ply.

e. The ply cords may not be laid onto the building drum with uniform straightness and tension, and the two beads may not be positioned perfectly parallel (relative to each other) over the ply on the building drum.

f. In the mold, cord shrinkage and carcass inflation may cause the cords to slip around the beads, but spliced portion (s) of the ply may tend to slip less than unspliced portion(s).

g. If the belt and tread are not positioned symmetrically over the green carcass, the green tire, and hence the cured tire, will not be uniform. The nominally cylindrical belt package may also be somewhat conical.

h. If the green tire is not positioned symmetrically within the mold, the cured tire will not be uniform.

i. In the mold, the inflated bladder tensions (stretches) the ply outward, and the ply's nylon or polyester fibers shrink when heated, thus tensioning the ply further. Under tension, the ply slips around the bead, possibly to a different extent at different locations around the bead, and a splice slips around the bead least.

j. In the mold, the rubber can "lock up" (stiffen curing) around the ply at different times at different locations, thus causing nonuniform ply stress.

TIRE UNIFORMITY MEASUREMENT

The degree of dimensional and/or dynamic uniformity in a tire may manifest itself in the tire's ability to run smoothly and vibration free, as well as in the "handling" of the tire. Therefore, after a tire is manufactured, and before it is sold, it is typically tested for tire uniformity characteristics. A variety of tire uniformity measuring (testing) machines (apparatuses) are known and are described, for example, in U.S. Pat. No. 4,171,641, U.S. Pat. No. 4,458,526, U.S. Pat. No. 5,022,186 and U.S. Pat. No. 5,103,669.

A typical tire uniformity testing process, and representative results obtaining therefrom, are presented in U.S. Pat. No. 5,365,781 (Rhyne; 1994; hereinafter referred to as the '781 Patent). (See also related U.S. Pat. No. 5,616,859 and U.S. Pat. No. 5,458,176)

As described in the '781 Patent, an initial force variation of an uncorrected tire, as tested, may be graphically illustrated to represent corresponding electrical signals from a tire uniformity tester. The force variation as a function of circumferential position on the tire, as represented by a waveform, may be decomposed into a series of desired harmonic waveforms. The harmonic waveforms are determined in a computer by a Fourier analysis of the radial force variation waveform sensed during rotation of the tire on the tire uniformity tester. The analysis and waveforms are stored in the computer and referenced to a particular tire. U.S. Pat. No. 3,739,533 also describes known techniques for measuring lateral and/or radial force variations in a pneumatic tire.

FIG. 2A is a graph illustrating a "composite" waveform (force variation curve) 202 such as may be generated by a tire uniformity tester (not shown), for a particular tire (not shown) being tested. The horizontal axis represents the circumferential position (from 0 to 360 degrees) on the tire being tested. The vertical axis represents the amplitude of a measured radial force variation, in any suitable units such as decaNewtons (daN). The composite waveform 202 is representative of the "raw" data from the tire uniformity tester and, as is evident, there is a variation in radial force as a relatively complex function of circumferential position on the tire. The composite waveform 202 can, in a computer (not shown) be decomposed into a series of any desired number of "harmonic" waveforms by employing a Fourier analysis of the composite waveform.

FIG. 2B is a graph similar to the graph of FIG. 2A, and illustrates a first (1st), a second (2nd) and a third (3rd) harmonic of the composite waveform 202 of FIG. 2A. The first harmonic waveform comprises a single sine wave (between 0 and 360 degrees), the second harmonic waveform comprises two sine waves (between 0 and 360 degrees), the third harmonic waveform comprises three sine waves (between 0 and 360 degrees) and, generally, the "Nth" harmonic" comprises N sine waves between 0 and 360 degrees. Together, these constituent harmonic waves, weighted by their respective amplitudes, substantially constitute the original composite measured waveform when added together.

Returning to FIG. 2A, a low amplitude on the composite waveform 202 represents a "soft spot" on the tire. Two such soft spots 210 and 212 are identified on the waveform 202. Similarly, a high amplitude on the composite waveform 202 represents a "hard spot" on the tire. One such hard spot 214 is identified on the waveform 202. A peak-to-peak magnitude between the soft spots and the hard spot(s) is indicative of a uniformity characteristic of the tire, and may be used as an input parameter for tire uniformity correction, which is discussed in greater detail hereinbelow. For example, as shown in FIG. 2A, there is approximately a 7 daN peak-to-peak variation between the soft spot 210 and the hard spot 214. Similar high and low amplitude force measurements are evident on the harmonic waves illustrated in FIG. 2B, are similarly indicative of tire uniformity characteristics, and may also be used as input parameters for tire uniformity correction.

Generally, if the uniformity characteristic of the tire has a magnitude which is less than a predetermined relatively low minimum threshold magnitude, which is deemed not to be detrimental to a vehicle ride or produce undesirable vibrations in the vehicle, the tire may be shipped to a customer. If the uniformity characteristic magnitude is greater than a predetermined relatively high maximum threshold magnitude, the tire may be scrapped. If the uniformity characteristic magnitude is between the relatively low minimum threshold magnitude and the relatively high maximum threshold magnitude, the tire may be suitable for correction.

Various analytical methods may be employed to determine whether the tire needs to be (and can be) "corrected"—in other words, its uniformity improved—based on determinations of:

a. the peak-to-peak value of the harmonic waveform or of the composite waveform (as discussed hereinabove with respect to FIGS. 2A and 2B);
 b. the first and second derivatives of radial and lateral waveforms (force variation curves), as compared with predetermined specifications (thresholds) (see, e.g., U.S. Pat. No. 5,639,962); or
 c. the mean or root-mean-square of a low-band filtered variation function (see, e.g., U.S. Pat. No. 4,702,103).

TIRE UNIFORMITY CORRECTION

Techniques for correcting tire uniformity can be grouped into two general categories "grinding", and "without grinding".

Grinding techniques typically involve grinding of tread rubber about the outer circumference of the tire at a selected location and up to 180 degrees about the outer circumference of the tire. Grinding of the tire can contaminate a tire plant environment, reduce the useful tread life of the tire or may render the tire visually unappealing. Examples of grinding techniques and methodologies may be found in U.S. Pat. No. 3,739,533, U.S. Pat. No. 3,848,368, U.S. Pat. No. 3,946,527, U.S. Pat. No. 4,736,546, U.S. Pat. No. 4,173,850, U.S. Pat. No. 4,536,054, U.S. Pat. No. 4,458,451, U.S. Pat. No. 4,458,451, U.S. Pat. No. 4,095,374, U.S. Pat. No. 5,022,186, U.S. Pat. No. 3,848,368, U.S. Pat. No. 3,880,556, U.S. Pat. No. 3,948,004, and WO 98/05937.

A number of techniques for correcting (e.g., improving, altering) tire uniformity without grinding are known, as follows.

U.S. Pat. No. 2,963,737 (Soderquist; 1960) discloses a machine for tire manufacture (post inflation). A method is described for preventing ply shrinkage and consequent tire distortion and cracked tread rubber in tires with nylon and synthetic plies. After vulcanizing at 315–350 degrees Fahrenheit, the tire is rimmed up at its beads (not supported by its tread to avoid distortion) and post-inflated at 50–60 psi while rotating (to avoid uneven cooling) at 10–20 rpm and being sprayed until it cools to 200 degrees Fahrenheit.

U.S. Pat. No. 3,039,839 (Waters, et al.; 1962) discloses a method of making tires, and addresses issues of tire shrinkage and distortion caused by shrinkage of nylon ply cords when removed from a mold without first being allowed to cool. As mentioned therein, when nylon cord tires are removed hot from the mold, the nylon cord in the tire plies tends to shrink and distort the tire from its molded shape. It is disclosed in this patent to narrow the bead set (bead spacing when on a tire building drum) to stretch the cords during molding. Then, upon removal of the hot tire from the mold, the tire is promptly mounted on an inflating rim, and retained inflated until it cools to below the nylon cord's shrinkage temperature of about 200 degrees Fahrenheit. This overcomes the objectionable shrinkage of cords in the tires, and an objectionable tire growth when the tires are run in service.

U.S. Pat. No. 3,389,193 (Hughes; 1968) discloses method and apparatus for shaping a deformed tire. The tire is heated in an oven to about 135 degrees Fahrenheit, and is then passed to a "tire shaping machine" where the uninflated tire is supported vertically on its tread by circumferentially spaced rollers (from below). Four idler pressure rollers (from above) apply pressure in a direction to cause the tread to buckle inwardly while rotating.

U.S. Pat. No. 3,464,264 (French; 1969) discloses a pneumatic tire run-in machine for removing temporary casing distortions, including flat spots. The tire is inflated, suspended and rotated within a plurality of rollers arranged around a circle with at least one of the rollers driving the tire. The small diameter of the rollers increases tire distortion and generates a large amount of heat, without requiring an external heating apparatus.

U.S. Pat. No. 3,529,048 (Kovac, et al.; 1968) discloses a method for processing of pneumatic tires wherein a tire is conditioned after being removed from the vulcanizing mold and before cooling to ambient temperature by applying a load, such as a radial load, to the tire tread while the tire is inflated and at the same time relatively moving the load along the tire, such as by rotating the tire, to cause deflection (alternate stressing and relieving of tire cords) along successive circumferential increments, all around the circumference of the tire. The conditioning steps are begun as quickly as possible, not more than within a few minutes, after the tire is removed from the mold, and the tire is conditioned for a time period of from one to two times the duration of the vulcanizing mold cycle, and the inflation pressure of the tire during conditioning is preferably of the general order of the service pressure of the tire. The exterior load on the tire being conditioned may be a radially inwardly directed radial load applied to the outside circumference of the tire. Alternatively, the exterior load may be a lateral load against the sidewall of the tire. Alternatively, the exterior load may be an oblique load (having radial and lateral force components) against the tire tread, shoulder or sidewall. The conditioning steps help obtain a more uniform tension in the tire cords while the curing or vulcanizing process continues while the hot tire is being cooled after removal from the mold. As noted in the patent, it is believed that the tire conditioning process may have one or more of the following actions on the hot tire for improving the uniformity of the tire.

"First, the aforementioned tire cords [cotton, rayon, nylon, polyester, or other man-made synthetic or textile cord] capable of exhibiting permanent changes in physical properties upon application of load and heat are alternatively stretched by the load and relaxed while hot to make generally uniform the stress in the fibers thereof . . . . Second, any of the separate plies or belt of the tire cords in the tire may move relative either to the other plies or belt or to the surrounding rubber to make uniform the stresses therebetween. Third, different portions of any kind of tire cord in any belt or ply may move relative to each other or to portions of surrounding rubber to make generally uniform the stresses in the cord in the tire even though the cord does not permanently change its physical characteristics."
(column 2, line 72 through column 3, line 18)

U.S. Pat. No. 3,632,701 (Devitt, et al.; 1972) discloses conditioning of tires to improve uniformity. Excessive radial force variations in a tire can be reduced by heating all or part of a tire while supported vertically and positioned so that the area of maximum force is located in the top quadrant of the tire. A suitable source such as a pot heater, rubber kiln or infrared heat may be used for heating. An elevated temperature (e.g., 150–280 degrees Fahrenheit) is maintained for a period of time (e.g., 60 minutes) while the tire is inflated to a pressure of 0–50 psi. The technique is applicable to nearly all types of tires including radial, belted bias, and bias tires containing rayon, nylon or polyester cords.

U.S. Pat. No. 3,635,610 (Hall, et al.; 1972) discloses a tire conditioning apparatus for removing flat spots and other surface irregularities from tires preliminary to recapping or truing them. Stress-producing conditions, including varying rates of cure applied after initial curing in the mold, the weight of a vehicle at rest, and the weight of tires pressing against other tires in a stack of tires, may cause flat spots and surface irregularities in the tires. An uninflated tire is rotated, heated, and pressed by a pressure roll assembly which has for its function flexing the tire and kneading it to work out the flat spots and surface irregularities in the tire.

U.S. Pat. No. 3,725,163 (Hofelt, Jr.; 1973) discloses a method of improving performance characteristics of pneumatic tires. Radial and lateral force variations are reduced by applying a small amount of material to portions of the tread area. This patent describes an exemplary apparatus for measuring these force variations and is exemplary of a number of patents involving the addition of material to a tire to improve a uniformity characteristic thereof.

U.S. Pat. No. 3,838,142 (Hochstein; 1974) discloses a procedure for correcting radial force variation in pneumatic tires using ionizing radiation of high energy electrons. A load drum is forced at normal operating load against the tread surface of an inflated rotating tire, and a force transducer measures the magnitude of force against the drum. The radiation source irradiates sections of the tread body and/or sidewalls which exert low force to increase their ply modulus of elasticity in those sections. The irradiation is done concurrently with the measuring.

U.S. Pat. No. 3,865,527 (McGhee, et al.; 1975) discloses tire conditioning and truing apparatus which "conditions" a tire to remove flat spots by heating its sidewalls while it is uninflated and rotating. See also related U.S. Pat. No. 3,945,277 (McGhee, et al.; 1976).

U.S. Pat. No. 3,872,208 (Brown, et al.; 1975) discloses corrective heating of pneumatic tires. Radial force variation of a cured tire are reduced by selectively heating the innerliner (from inside the tire) in an area adjacent to excessive radial force variation for a predetermined time or to reach a predetermined temperature (typically 225–240 degrees Fahrenheit). The tire mounted on a support flange (not a rim) by its bead, is uninflated, and is positioned vertically with the heated portion positioned upward. See also related U.S. Pat. No. 3,880,556 (Brown, et al.; 1975).

U.S. Pat. No. 4,420,453 (Doi, et. al.; 1984) discloses apparatus for measuring tire uniformity. A tire is removed from the mold, held uninflated until it cools to 149 degrees Celsius, and then post inflated until cooled to below 90 degrees Celsius, while being supported solely by its bead edges. This allows the cord modulus to increase dramatically before inflating, and reduces the tendency for sidewall waviness as compared with a tire which is post-inflated immediately after molding.

U.S. Pat. No. 5,060,510 (Rosseau; 1991) discloses a method of correcting variations in radial force between a tire and the ground. The correction is effected by means of wedges in the form of circular rings placed between the mounting rim and the beads of the tire. The thickness of the wedge, at various positions around the tire, is related to the measure of force variation.

U.S. Pat. No. 5,365,781 (Rhyne; 1994; '781 Patent) discloses tire uniformity correction without grinding. A tire is tested for uniformity and an electrical signal is generated, as described hereinabove. Then, tire uniformity is corrected by stretching at least a portion of at least one carcass reinforcing member beyond its elastic limit for a predetermined time, thereby permanently deforming the at least one, and preferably many, carcass reinforcing members, either by inflating the tire to a significantly raised pressure or by mechanical means. The stretching results in a permanent lengthening (elongation) of the carcass reinforcing member by a predetermined amount in the range of 0.1 to 2 or 3 percent and at a location which are a function of the measured uniformity characteristic. The techniques are generally applicable to correcting a uniformity characteristic in a cured tire. As noted in the '781 Patent, materials of the carcass reinforcing member(s) such as nylon and polyester are readily adaptable to correction by the present invention. Materials such as steel, Kevlar (tm) and rayon are not as easily permanently elongated and may require higher pressure or longer hold time. Selected ones of the techniques for uniformity correction set forth in the '781 Patent are discussed hereinbelow with respect to FIGS. 3, 3A, 4, 5 and 6.

FIGS. 3A and 3B (comparable to FIG. 8 and FIG. 9, respectively, of the '781 patent) illustrate a tire being corrected for uniformity, according to a technique such as is described in the '781 Patent.

The tire 300 (compare 100) includes a pair of annular, inextensible beads 302 and 304 (compare 102 and 104), each of which is disposed within a respective bead portion 306 and 308 (compare 106 and 108) of the tire 300, and includes a generally cylindrical tread portion 310 (compare 110), (optionally) a belt structure ("belts") 312 (compare 112) disposed within the tread portion 310, and sidewall portions 314 and 316 (compare 114 and 116) extending between opposite sides 310*a* and 310*b* (compare 110*a* and 110*b*) of the tread portion 310 and respective ones of the beads 302 and 304. The tire 300 has a section height SH, an equatorial plane EP and an axis of rotation A. An inner liner (not shown) is disposed on the inner surface 318 of the tire 300. The tire has an outer surface 319.

At least one carcass reinforcing member 320 (or "ply", compare 120) extends between the two beads 302 and 304, through the carcass of the tire. The carcass reinforcing member 320 has a central portion 320*a* (compare 120*a*) which is disposed between the two beads 302 and 304, and has two opposite end portions ("turn-up" ends) 320*b* and 320*c* (compare 120*b* and 120*c*), which wrap around a respective one of the beads 302 and 304 and extend radially back towards the tread portion 310 of the tire 300. The tire 300 may further include bead filler apexes (not shown, compare 122 and 124) disposed atop respective ones of the beads 302 and 304 and extending radially outwardly therefrom.

In a tire which has cooled down after being molded, the turn-up ends 320*b* and 320*c* are, for purposes of this discussion of a tire uniformity correction technique, essentially "attached" to a respective one of the beads 302 and 304 and, as will be described in greater detail hereinbelow, the central portion 320*a* of the carcass reinforcing member 320 is essentially "attached" to the belt structure 312.

Relevant portions of a tire uniformity correction machine (apparatus) are shown and described, as follows, as well as a technique for performing uniformity correction.

The tire 300 is mounted to a rim-like structure comprising two rim halves 322 and 324. The bead portions 306 and 308 engage the rim halves 322 and 324 in an airtight manner so that the tire 300 can be inflated.

Restraint rings 332 and 334 engage sidewalls 314 and 316, respectively, of a tire 300 with different axial displacements D1 and D2, respectively, to impart a different radius of curvature R1 and R2, respectively, to portions of the carcass reinforcing member 320 (best viewed in FIG. 3A) in each of the sidewalls, approximately halfway between a respective bead and the belt structure 312. As best viewed in FIG. 3B, the restraint ring 332 deflects the sidewall 314 of the tire 300 from an undeflected configuration (shown in dashed lines) axially inwardly (towards the opposite sidewall of the tire). The sidewall-contacting surfaces of the restraint rings 332 and 334 may be rounded to avoid sharp edges being in contact with the sidewalls 314 and 316, respectively, of the tire 300. Each restraint ring 332 and 334 has a radial length of engagement LE1 (best viewed in FIG. 3B) with the sidewall 314 of the tire 300 which is a relatively small percentage (i.e. less than 25%) of the section height SH of the tire 300. The restraint rings 332 and 334 may each preferably have a flat or planar surface 332a and 334a, respectively, urging against a respective sidewall 314 and 316 of the tire 300, for use in correction of a first harmonic or composite of radial force variation or in correction of conicity.

With the restraint rings 332 and 334 fixed in place and with the sidewalls 314 and 316 deflected, as shown, the tire 300 is inflated with a relatively high inflation pressure (INFLATION PRESSURE), such as 100 pounds per square inch (psi) or 7 bars. This will create a load in the carcass reinforcing member 320 thereby stretching beyond its elastic limit and permanently deforming the carcass reinforcing member 320 by an amount and at a location which are functions of the measured uniformity characteristic, resulting in a permanent lengthening (elongation) of the carcass reinforcing member to thereby correct (improve) the uniformity characteristic of the tire 300. A belt restraint ring 336 (omitted from the view of FIG. 3B) may be optionally provided in contact with the tread portion 310 to counteract the relatively high inflation pressures so that the belt structure 312 is not excessively expanded in the circumferential direction.

As best viewed in FIG. 3B, the carcass reinforcing member 320 has an upper end point 320d at which load in the carcass reinforcing member is transmitted to the belt structure 312 of the tire 300, and has a lower end point 320e in the area of the bead 302, at which load in the carcass reinforcing member 320 is transmitted to the bead 302 of the tire 300. The radius of curvature R2 in a maximally restrained portion of the tire 300 corresponding to displacement D2 is significantly less than radius of curvature R1 in the minimally restrained portion of the tire corresponding to displacement D1. Different radii of curvature provide different tension values in respective carcass reinforcing members (320).

As best viewed in FIG. 3A, with the restraint rings 332 and 334 in place and with the relatively high inflation pressure acting upon the sidewalls 314 and 316 of the tire 300, it is apparent that the original or unrestrained radius of curvature R1 of the carcass reinforcing member 320 has changed and becomes a relatively smaller radius of curvature R2. (The larger radius of curvature R1 occurs at locations of minimum restraint around the tire 300 with a planar surface restraint ring.) Physically, the smaller radius R2 of portion of the carcass reinforcing member, when the interior of the tire 300 is subjected to the relatively high inflation pressure, will not be permanently elongated the same amount as the unrestrained portion of the carcass reinforcing member 320 having the relatively larger radius of curvature R1. Generally, for a given inflation pressure, a larger radius of curvature of a portion of the carcass reinforcing member results in a relatively higher tension acting on that 10 portion of the carcass reinforcing member. The higher tension in portions of the carcass reinforcing member 320 generally results in a relatively greater elongation above the elastic limit of the carcass reinforcing member 320 which results in its permanent elongation.

The '781 Patent discloses a number of variations on and applications for the technique and apparatus described hereinabove, some of which are described hereinbelow with respect to FIGS. 4, 5 and 6. For example, when the first harmonic radial force variation is caused by tire attributes other than radial runout, it may be necessary to introduce a radial runout to reduce the magnitude of the first harmonic radial force variation. For example, rather than having a flat planar surface 332a on the restraint ring (e.g., 332), the restraint ring may have a cupped segment extending, for example, over a 90 degree arc length of the restraint ring so as to provide nonlinear restraint to the sidewall of the tire.

FIG. 4 (comparable to FIG. 15 of the '781 Patent) illustrates a tire being corrected for uniformity, according to a technique such as is described in the '781 Patent. This technique is generally similar to the technique described with respect to FIGS. 3A and 3B. A tire 400 is essentially identical to the tire 300 in that it has a tread portion 410 (compare 310), a bead 402 (compare 302) in a bead portion 406 (compare 306), (optionally) a belt structure 412 (compare 312) in the tread portion 410, a sidewall 414 (compare 314), an inner surface 418, and an outer surface 419. At least one carcass reinforcing member 420 (compare 320) extends between the two beads of the tire 400, only one 402 of which is visible in FIG. 4, through the carcass of the tire, and has a central portion 420a (compare 320a) and two opposite end portions ("turn-up" ends), one 420b of which is visible in FIG. 4, which wrap around a respective one of the beads 402 and extend radially back towards the tread portion 410 of the tire 400. For purposes of this discussion, the tire 400 is assumed to already have cooled down after being molded, in which case the carcass reinforcing member 420 has an upper end point 420d (compare 320d) at which load in the carcass reinforcing member is transmitted to the belt structure 412 of the tire 400, and has a lower end point 420e (compare 320e) in the area of the bead 402, at which load in the carcass reinforcing member 420 is transmitted to the bead 302 of the tire 400.

The tire 400 is mounted to a rim-like structure comprising two rim halves, a one 422 (compare 322) of which is visible in FIG. 4. A restraining ring 432 (compare 332) having a flat surface 432a (compare 332a) is urged against the sidewall 414 of the tire 400, and has a radial length of engagement LE2 (compare LE1) which is a relatively large (e.g., greater than 25%) percentage of the section height (SH) of the tire 400, resulting in a radius of curvature R3 which is less than the initial (unrestrained) radius of curvature R1. In a manner similar to the technique described hereinabove with respect to FIGS. 3A and 3B, an elevated air pressure (AIR PRESSURE) within the tire 400 provides the motive force for stretching the carcass reinforcing member 420 beyond its elastic limit, resulting in its permanent elongation.

FIG. 5 (comparable to FIG. 11 of the '781 Patent) illustrates a portion of a carcass reinforcing member 520 (compare 420) of a tire (not shown, compare 400) being corrected for uniformity. As in the previous examples, the carcass reinforcing member 520 (compare 420) has an upper end point 520d (compare 420d) which is essentially "attached" to the belt structure (not shown), and a lower end point 520e (compare 420e) which is essentially "attached" to one of the beads (not shown) of the tire.

In this example, a sidewall of the tire, hence the carcass reinforcing member 520, is restrained at two radially-separated locations, one location 542 being near the tire's belt (and adjacent the point 520d) the other location 544 being near the tire's bead (and adjacent the point 520e). This dual-location restraint is effectuated by a restraint device 530 comprising two portions 532 and 534 that contact the sidewall of the tire at the two radially separated locations 542 and 544, respectively.

The two portions 532 and 534 of the restraint device 530 are spaced apart from one another. Therefore, the sidewall of the tire has an unrestrained length "UL" which will be deflected by the inflation pressure (INFLATION PRESSURE) during correcting. The restraint device 530 allows the carcass reinforcing member 520 to have a deflection and a radius of curvature R4 which is smaller than the initial unrestrained radius of curvature R1 under the influence of the inflation pressure. The carcass reinforcing member 520 is shown as a dashed line 520' prior to inflation, and as a solid line after inflation.

The restraint device 530 may be sized so that the unrestrained length UL varies circumferentially around the tire. In this manner, the carcass reinforcing member(s) 520 may be permanently elongated during inflation a greater amount where the unrestrained length UL has a larger dimension.

FIG. 6 (comparable to FIG. 17 of the '781 Patent) illustrates a tire being corrected for uniformity, according to a technique such as is described in the '781 Patent. This technique differs from the techniques described hereinabove with respect to FIGS. 3, 3A, 4 and 5 in that the carcass reinforcing member 620 (compare 520) is stretched by mechanical means rather than by restraining the sidewall(s) of the tire and inflating the tire to a significantly raised pressure. Nevertheless, the stretching results in a comparable permanent lengthening (elongation) of the carcass reinforcing member 620.

The tire 600 is essentially identical to the tire 400 in that it has a tread portion 610 (compare 410), a bead 602 (compare 402) in a bead portion 606 (compare 406), (optionally) a belt structure 612 (compare 412) in the tread portion 610, a sidewall 614 (compare 414), an inner surface 618, and an outer surface 619.

At least one reinforcing (or "carcass") ply 620 (compare 420) extends between the two beads of the tire 600, only one 602 of which is visible in FIG. 6. For purposes of this discussion, the tire 600 is assumed to already have cooled down after being molded and, as in the previous examples, the carcass reinforcing member 620 has an upper end point 620d (compare 420d) which is essentially "attached" to the belt structure 612, and a lower end point 620e (compare 420e) which is essentially "attached" to one 602 of the beads of the tire 600.

A mechanical means 630 for stretching and permanently elongating the carcass reinforcing member 620 comprises the following elements:

a. elements 632 and 634 (compare 422) which hold the bead portion 606 of the tire 600;

b. an element 636 which holds the tread portion 610 of the tire 600; and c. an element 638 which pushes axially outwardly on the sidewall 614 of the tire 600.

The tire 600 is shown with the element 638 stretching the sidewall 614 of the tire 600 axially outwardly to elongate and permanently deform the carcass reinforcing member, as discussed hereinabove. The pre-stretched carcass reinforcing member 620 is illustrated by the dashed line 620'. The force applied by the element 638 to the sidewall 614 of the tire 600, to deflect the sidewall 614 and stretch the carcass reinforcing member 620, is directed parallel to the axis of rotation of the tire at a position on the inside surface of the sidewall 614 which is approximately halfway between the bead 602 and the belt structure 612. Therefore, the force is substantially "normal" (e.g., at 90 degrees) to the surface of the sidewall (or radial with respect to the curvature of the sidewall, as distinguished from radial with respect to the tire's axis of rotation). It is disclosed in the '781 Patent (see, e.g. FIG. 19 and related discussion therein) that, in an alternate embodiment of stretching the carcass reinforcing member by a mechanism, mechanical stretching of the carcass reinforcing member beyond its elastic limit can be accomplished by radially (with respect to the tire's axis of rotation) stretching the carcass reinforcing member between its upper 620d and lower 620e attachment points, such as by moving the lower attachment point 620 radially inward and the attachment point 620d radially outward. It is also disclosed in the '781 Patent that stretching the carcass reinforcing members could be accomplished by a combination of mechanical stretching and by inflation pressure stretching.

There have thus been described a number of techniques for correcting tire uniformity. Generally, in all of the techniques describe hereinabove with respect to FIGS. 3A, 3B, 4, 5 and 6, tire uniformity correction may be achieved only by stretching a carcass reinforcing member (e.g., the cords of the ply) beyond its elastic limit, thereby permanently deforming and elongating the carcass reinforcing member. This may reduce the ply's strength, fatigue resistance, and adhesion to the rubber. Also, the forces required to permanently deform the carcass reinforcing members, whether applied by pressure or by mechanical devices, will exert tremendous stress on the beads. More generally, it should be appreciated that it is generally undesirable to stretch an elastic member to the point where it permanently deforms, since this may adversely affect the elastic member's subsequent ability to exert and/or react forces—in other words, to act in an elastic mode in a predicable manner. (Consider, for example, the case of a stretched out elastic waistband on a garment.) In a worst case, the elastic member may be stretched to the point that it breaks, rendering it essentially useless.

Another nuance of the stretching/deforming techniques described hereinabove with respect to FIGS. 3A, 3B, 4, 5 and 6 is that the tire (e.g., 300) must first be cooled down from the molding process sufficiently that the carcass reinforcing member (e.g., 320) is essentially attached at its ends (e.g., 320d and 320e) between the belt (e.g., 312) and the bead (e.g., 302) and can be stretched and deformed between those two ends.

Another nuance of the stretching/deforming techniques described hereinabove with respect to FIGS. 3A, 3B, 4, 5 and 6 is that a tire which has been corrected in such a manner may be required to sit for a period of time ("sit period"), for example twenty four hours, sufficient to take into consideration any viscoelastic relaxation that occurred in the tire after correction, after which time period it may be necessary to re-test the tire for uniformity.

As mentioned above, cords of a carcass reinforcing member (ply) may be made of a variety of materials, including nylon, polyester, steel, Kevlar (tm) and rayon. According to the '781 Patent, the stretching/deforming techniques disclosed therein are not as readily adaptable to correcting tires with steel (metal), Kevlar (tm) and rayon cords.

What is therefore needed is a technique for tire uniformity correction, without grinding, which does not permanently deform the cords of a carcass reinforcing member beyond their elastic limit, which can be utilized on tires having any of a variety of cord materials, which can possibly be performed on a "hot" tire (one which has not completely cooled down from the molding process) and which does not require a "sit period".

BRIEF DESCRIPTION OF THE INVENTION

It is an object of the present invention to provide methods and apparatuses for correcting one or more uniformity characteristics of a pneumatic tire by changing the tension characteristics of the tire under normal inflation.

According to the invention, a method of manufacturing a pneumatic tire having a pair of spaced beads and a carcass reinforcement ply extending between the beads for improving one or more tire uniformity characteristics is disclosed. The method is characterized by the steps of: A) forming the carcass reinforcement ply of a plurality of reinforcement cords embedded in a matrix material that can be rendered plastic and rendered non-plastic, which, respectively, permits and restricts reorienting the reinforcement cords; B) rendering the material plastic, after the tire has been vulcanized, to permit one or more of the reinforcement cords to be reoriented; C) reorienting one or more reinforcement cords with respect to other reinforcement cords or tire components, without their being stretched beyond their elastic limits, to improve a tire uniformity characteristic; and D) rendering the matrix material non-plastic, to restrict further reorientation of the reoriented reinforcement cords.

The method is further characterized by the step of selecting the matrix material of a thermoplastic having a deflection temperature of at least 121 degrees C. and preferably between 121 degrees C. and 190 degrees C. The matrix material can be a thermoplastic with a deflection temperature, and the step of rendering the matrix material plastic can includes the step of maintaining the matrix material to at least the deflection temperature, and the step of rending the matrix material non-plastic can include the step of cooling the matrix material to below the deflection temperature. The step of rendering the matrix material plastic can include heating only selected portions of the tire to at least the deflection temperature to permit reorientation of selected reinforcement cords. The tire can be heated in a tire mold to at least the deflection temperature to permit reorientation of the reinforcement cords. Alternatively, the reorienting of the reinforcement cords can occur when the tire is still hot from the tire mold and above the deflection temperature.

The method of reorienting the reinforcement cords includes reorienting the one or more reinforcement cords with respect to a component of the tire, such as slipping the reinforcement cords around a bead.

The method includes the step of applying a force, such as air pressure, for moving the portions of the reinforcement cords after removal from the tire mold. In addition, the method can include the step of applying a force to the tread of the tire after removal from the tire mold.

Also according to the invention, a tire comprises a tread portion, a bead portion, a sidewall portion, and a carcass reinforcing ply formed with a plurality of reinforcement cords selected from the group comprising Kevlar, steel, rayon, and nylon embedded in a matrix material that selectively permits and restricts reorientation of the reinforcement cords relative to other materials or components of the tire. The reinforcement cords are reoriented to improve a tire uniformity characteristic after the tire has been at least partially vulcanized without the reinforcement cords being permanently stretched beyond their elastic limit. The matrix material is a thermoplastic material having a deflection temperature of at least 121 degrees C. and preferably between 121 degrees C. and 190 degrees C.

Other objects, advantages and features of the invention will become apparent in light of the following descriptions thereof.

BRIEF DESCRIPTION OF THE DRAWINGS

Reference will be made in detail to preferred embodiments of the invention, examples of which may be illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1A:
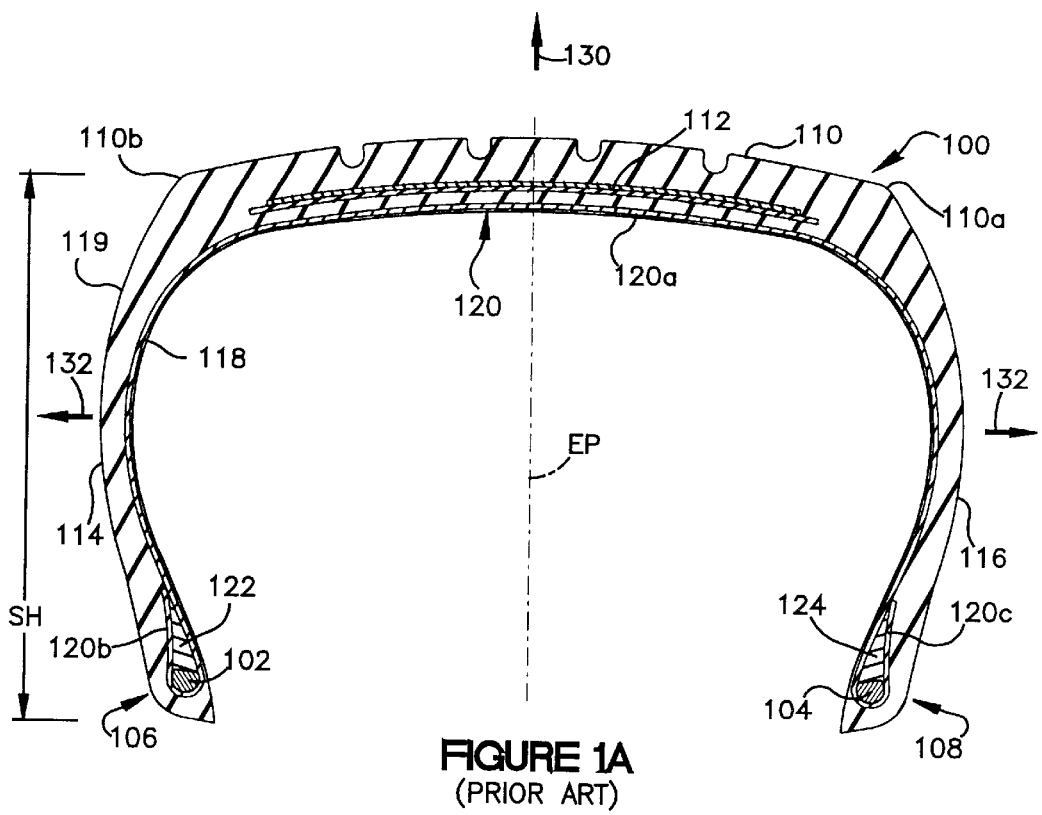

Elements of the figures are typically numbered as follows. The most significant digits (hundreds) of the reference number corresponds to the figure number. Elements of FIG. 1 are typically numbered in the range of 100–199. Elements of FIG. 2 are typically numbered in the range of 200–299. Similar elements throughout the drawings may be referred to by similar reference numerals. For example, the element 199 in a figure may be similar, and possibly identical to the element 299 in another figure. In some cases, similar (including identical) elements may be referred to with similar numbers in a single drawing. For example, each of a plurality of elements 199 may be referred to individually as 199a, 199b, 199c, etc. Such relationships, if any, between similar elements in the same or different figures will become apparent throughout the specification, including, if applicable, in the claims and abstract.

Figure 1B:
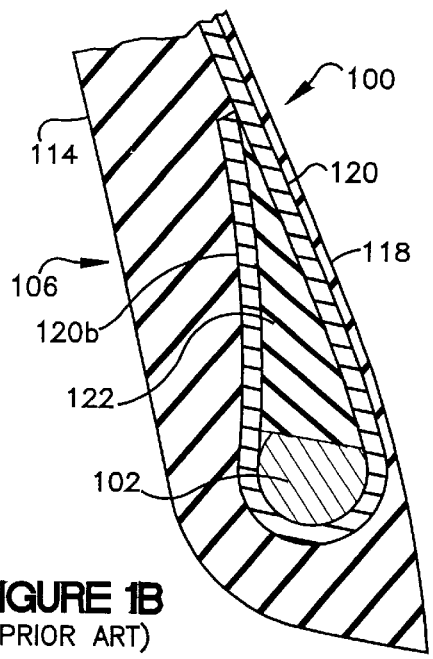
Figure 2A:
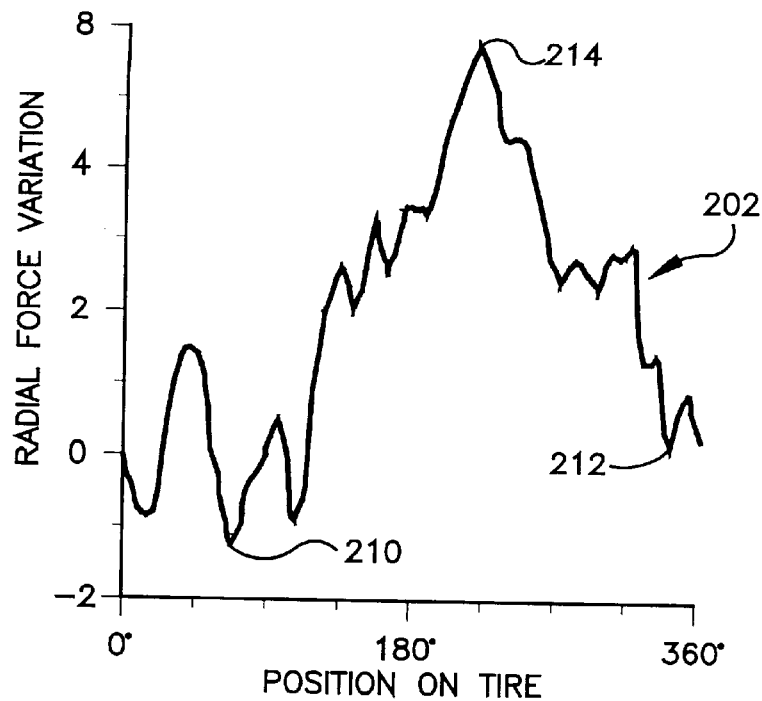
Figure 2B:
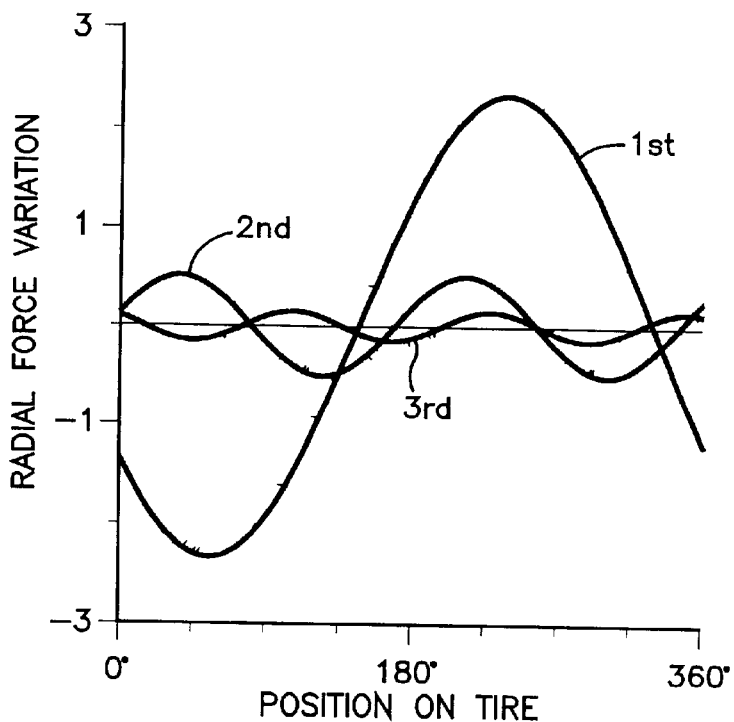
Figure 3A:
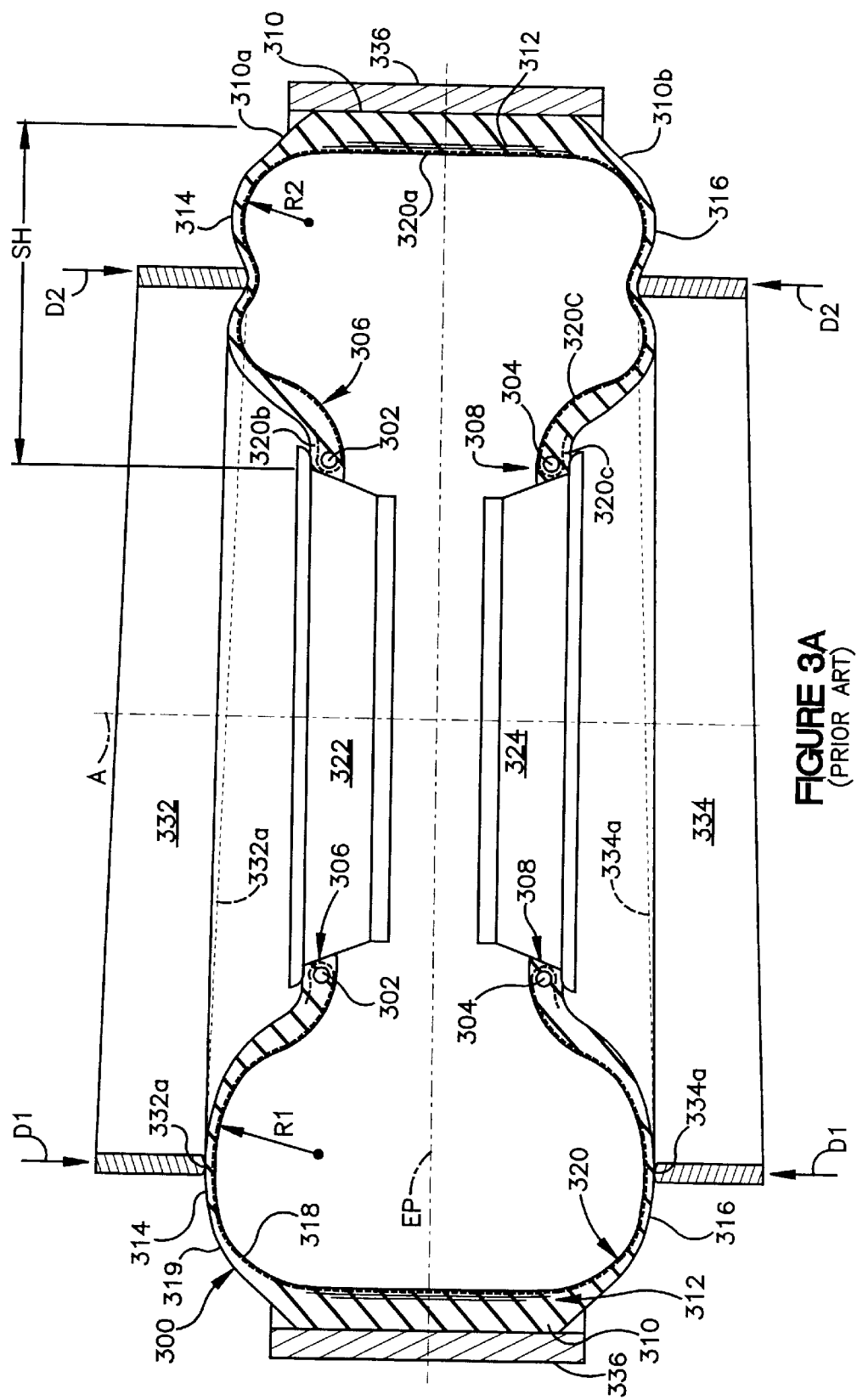
Figure 3B:
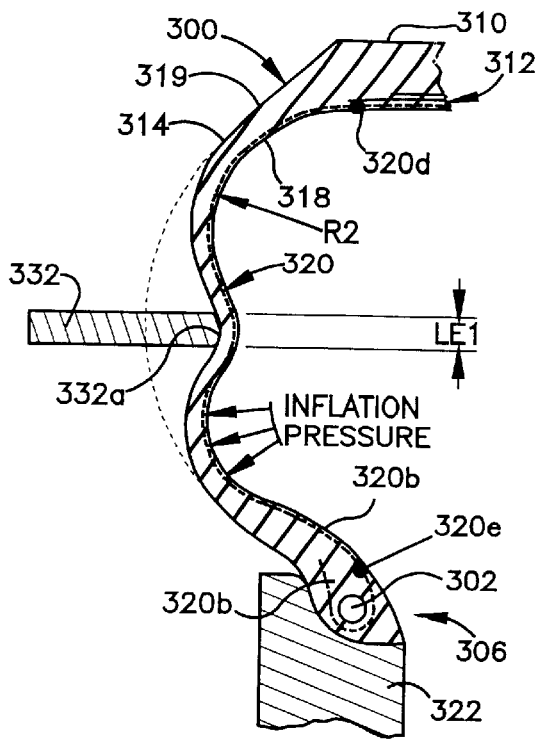
Figure 4:
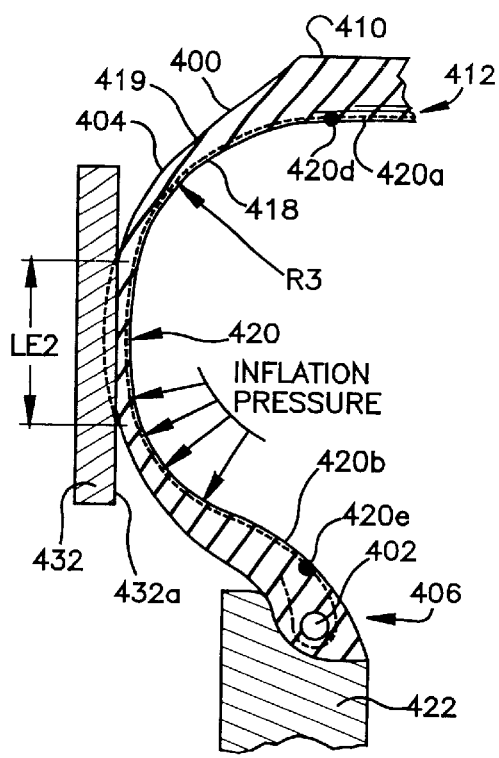
Figure 5:
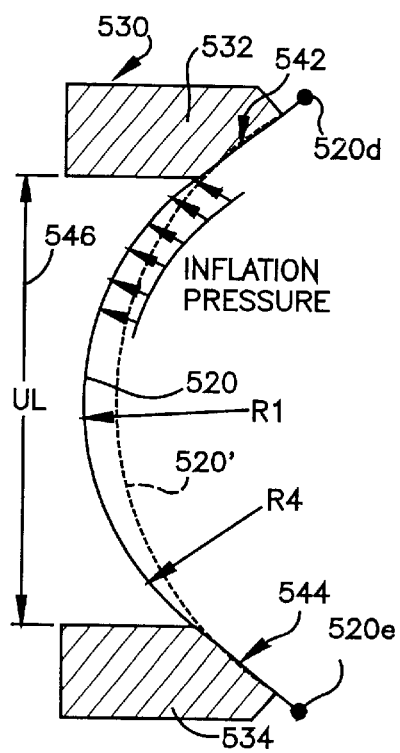
Figure 6:
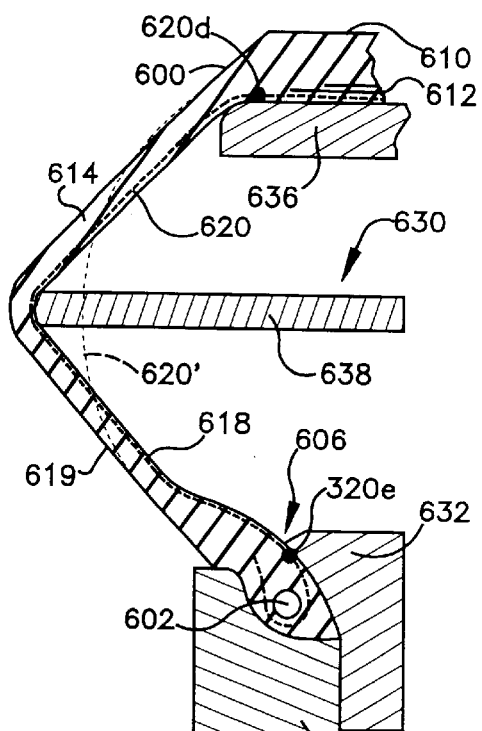
Figure 7A:
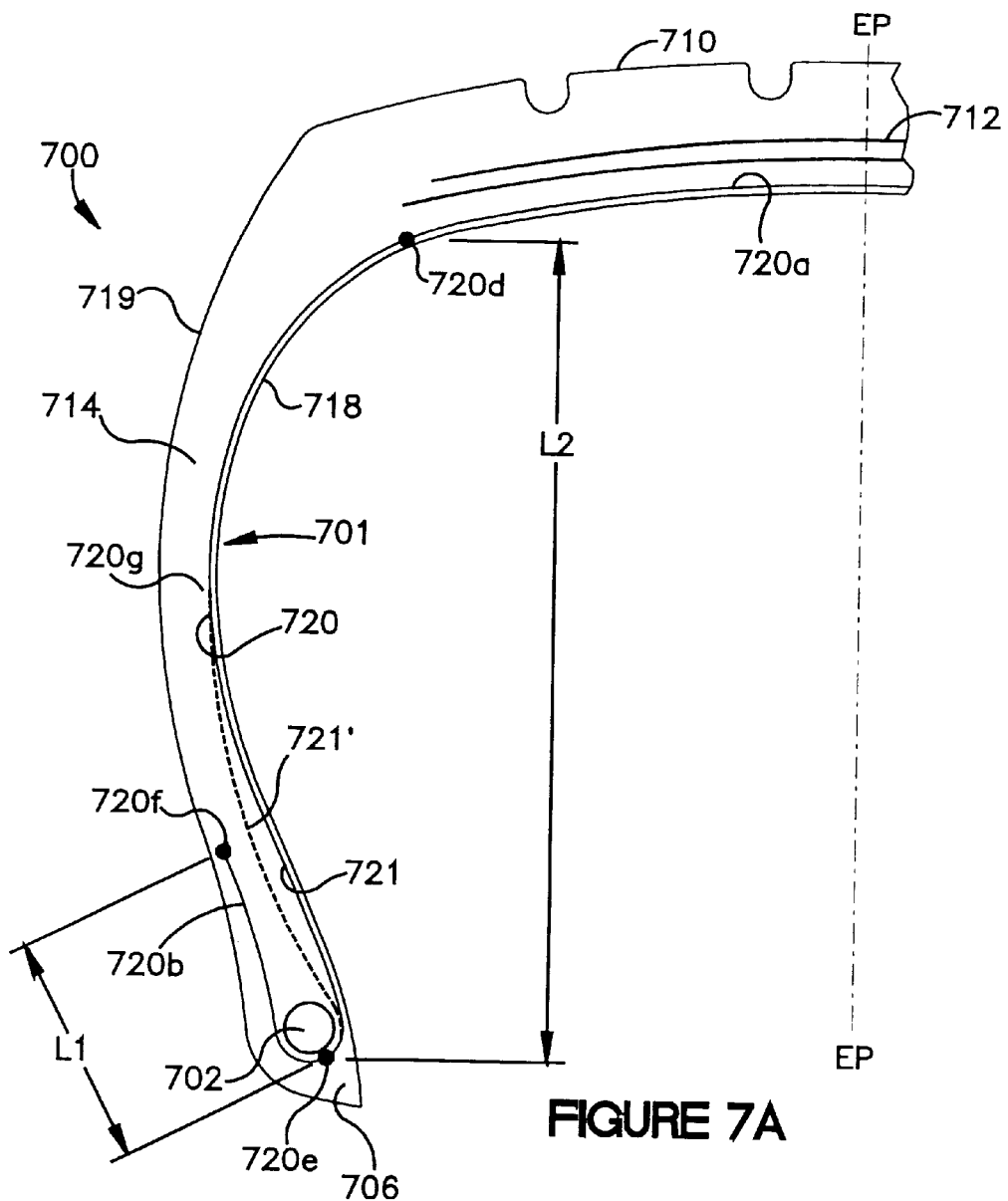
Figure 7B:
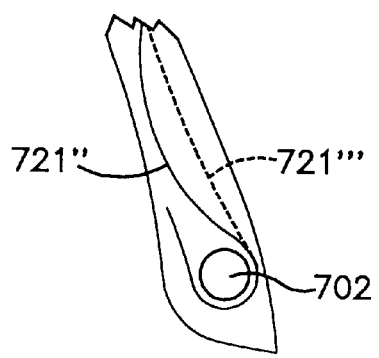
Figure 8:
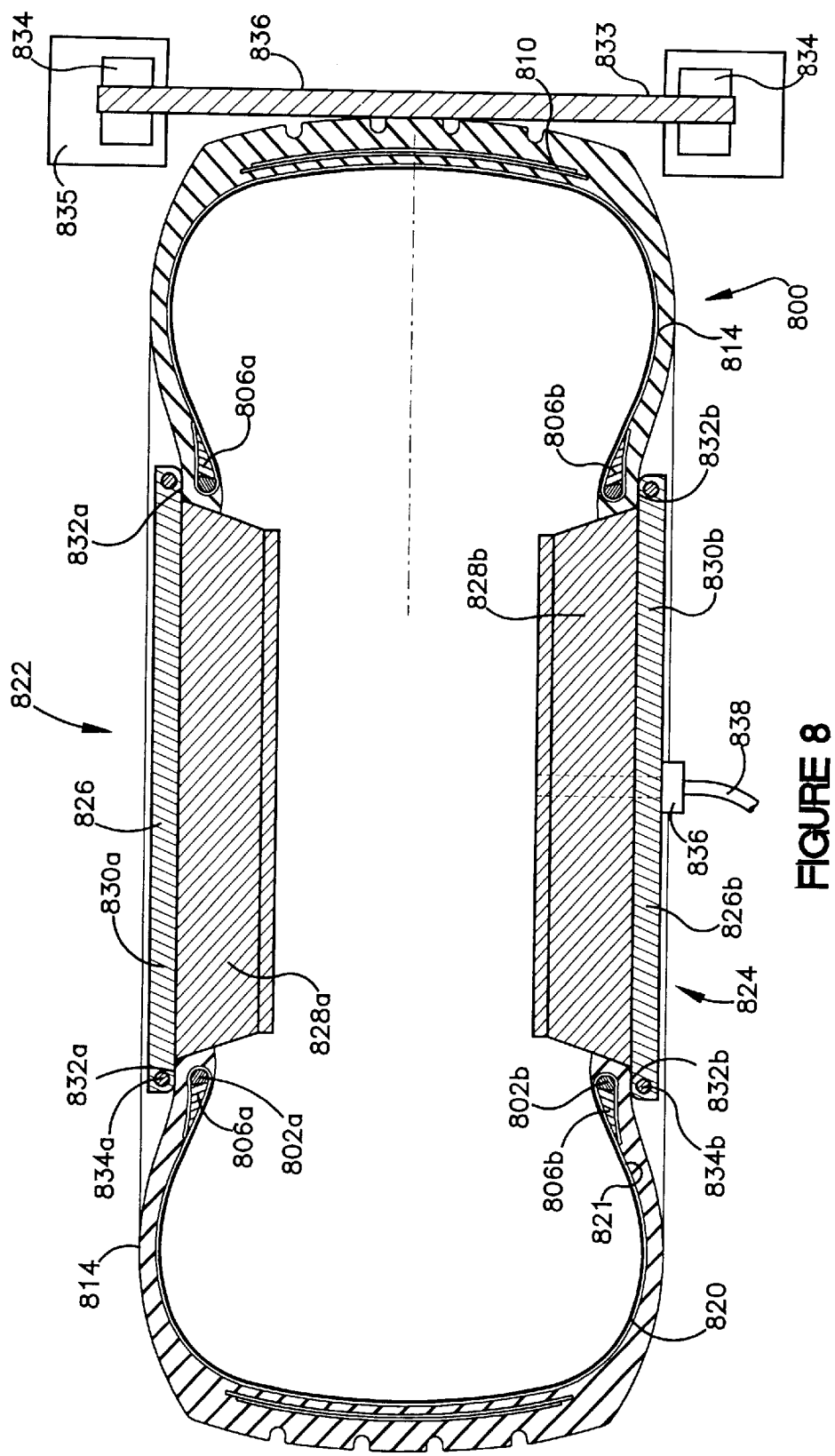

The structure, operation, and advantages of the present preferred embodiment of the invention will become further apparent upon consideration of the following description taken in conjunction with the accompanying drawings, wherein:

FIG. 1A is a cross-sectional view of a pneumatic tire of the prior art;

FIG. 1B is an enlarged view of a portion of the pneumatic tire of FIG. 1A;

FIG. 2A is a graph illustrating a "composite" waveform such as may be generated by a tire uniformity tester, for a tire being tested, according to the prior art;

FIG. 2B is a graph illustrating "harmonic" waveforms of the composite waveform shown in FIG. 2A, according to the prior art;

FIG. 3A is a cross-sectional view of a tire being acted upon by a uniformity correction apparatus of the prior art;

FIG. 3B is a cross-sectional view of a portion of the tire of FIG. 3A being acted upon by a uniformity correction apparatus of the prior art;

FIG. 4 is a cross-sectional view of an alternate embodiment of a prior art technique for correcting tire uniformity;

FIG. 5 is a schematic representation of an alternate embodiment of a prior art technique for correcting tire uniformity;

FIG. 6 is a cross-sectional view of an alternate embodiment of a prior art technique for correcting tire uniformity;

FIG. 7A is a cross-sectional view of a section of a tire having a ply cord reoriented to a more curvaceous shape to correct tire uniformity characteristics after being partially cured, according to the invention;

FIG. 7B is a cross-sectional view of a partial section of the tire of FIG. 7A showing a ply cord reoriented to a less curvaceous shape to correct the tire uniformity characteristics after being partially cured;

FIG. 8 is a cross-sectional view of a post cure uniformity apparatus for correcting a uniformity characteristic of a tire, according to the invention.

DEFINITIONS

The following terms may be used throughout the descriptions presented herein and should generally be given the following meaning unless contradicted or elaborated upon by other descriptions set forth herein.

"Axial" and "axially" refers to directions that are on or are parallel to the tire's axis of rotation.

"Bead" refers to that part of the tire comprising an annular, substantially inextensible tensile member, typically comprising a cable of steel filaments encased in rubber material.

"Belt structure" or "reinforcement belts" or "belt package" refers to at least two annular layers or plies of parallel cords, woven or unwoven, underlying the tread, unanchored to the bead, and having both left and right cord angles in the range from 18 to 30 degrees relative to the equatorial plane of the tire.

"Circumferential" refers to circular lines or directions extending along the perimeter of the surface of the annular tread perpendicular to the axial direction; it can also refer to the direction of the sets of adjacent circular curves whose radii define the axial curvature of the tread, as viewed in cross section.

"Conicity" refers to a dynamic non-uniformity which may exhibit itself as a tendency of a rotating tire to generate a lateral force regardless of the direction of rotation of the tire, and will manifest itself as a deviation from straight tracking of the tire. Conicity is typically expressed in terms of average lateral force generated during rotation in both directions of the tire.

"Cord" refers to one of the reinforcement strands, including fibers or metal or fabric, with which the plies and belts are reinforced.

"Dimensional non-uniformities" refers to asymmetries that are measurable when the tire is at rest (static).

"Dynamic non-uniformities" refers to asymmetries in rigidity that are manifested essentially only when the tire is centrifugally stressed while rotating.

"Equatorial plane" refers to a the plane perpendicular to the tire's axis of rotation and passing through the center of its tread, or midway between the tire's beads.

"Inflation" refers to the tire cold inflation pressure required for specific loads and speed conditions.

"Inner liner" refers to the layer or layers of elastomer or other material that form the inside surface of a tubeless tire and that contain the inflating gas or fluid within the tire.

"Lateral" refers to directions parallel to the tire's axis of rotation.

"Normal inflation pressure" refers to the specific design inflation pressure at a specified load assigned by the appropriate standards organization for the service condition for the tire.

"Ply" refers to a cord-reinforced carcass reinforcing member (layer) of rubber-coated radially deployed or otherwise parallel cords.

"Pneumatic tire" refers to a laminated mechanical device of generally toroidal shape (usually an open-torus) having two beads, two sidewalls and a tread and made of rubber, chemicals, fabric and steel or other materials.

"Radial" and "radially" refers to directions perpendicular to the tire's axis of rotation.

"Radial force variation" refers to a dynamic non-uniformity, and may be exhibited by a change in the force that a tire under constant normal load (i.e., a load that is perpendicular to the axis of the tire) exerts upon a smooth test surface, such as a roller, when the tire is rotated upon the test surface.

"Radial ply tire" and "radial tire" refers to a belted or circumferentially-restricted pneumatic tire in which at least one ply has cords which extend from bead-to-bead are which are laid at cord angles at about a 90 degree angle to the centerline of the tire.

"Radial runout" refers to a dimensional non-uniformity, wherein the tread radius exhibits lack of symmetry around its circumference (either out-of-round or not concentric around the tire axis).

"Runout" refers to a difference between maximum and minimum indicator readings as applied to:

a. Radial wheel runout—The difference between the maximum and minimum measurements of the wheel bead seat radii measured perpendicular to the spin axis.

b. Lateral wheel runout—The difference between the maximum and minimum measurements parallel to the spin axis on the inside vertical portion of the rim flange.

c. Radial tire runout—The difference between the maximum and minimum measurements on the tread surface and in a plane perpendicular to the spin axis while the tire is mounted on a true wheel.

d. Lateral tire runout—The difference between the maximum and minimum measurements parallel to the spin axis at the widest point of each sidewall of a tire on a true running wheel.

"Section height" (SH) refers to the radial distance from the nominal rim diameter to the outer diameter of the tire at its equatorial plane.

"Sidewall" refers to the portion of a tire between the tread and the bead.

"Tangential" and "tangentially" refer to segments of circular curves that intersect at a point through which can be drawn a single line that is mutually tangential to both circular segments.

"Turn-up end" refers to a portion of a carcass ply that turns upward (i.e., radially outward) from the beads about which the ply is wrapped.

"Uniformity" refers to a measure of a tire's ability to run smoothly and vibration free. Sometimes measured as tire balance or radial and lateral force variation.

"Uniformity characteristic" refers to the deviation of a newly molded tire from the ideal measures of radial runout, radial force variation and conicity.

DETAILED DESCRIPTION OF THE INVENTION PRINCIPLE OF CONSTRUCTING A UNIFORM TIRE

In the past, each tire, upon removal from a conventional tire mold, yielded different uniformity characteristics, i.e. deviations from perfect dimensional and dynamic uniformity. The deviations are due to factors such as, the inconsistencies in materials, placement of the materials on the building drum, and other process variables, as discussed hereinbefore.

The present invention is directed to novel manufacturing methods and tire constructions that can allow for corrections of a dimensional non-uniformity, i.e. a non-uniformity that is measurable when the tire is at rest, and/or a dynamic non-uniformity, i.e. a nonuniformity manifested only when the tire is rotating.

In a "perfect" tire, the reinforcement cords in the carcass ply have a substantially uniform tension. Basically, this uniform tension exits in the sections of the reinforcement cords of the carcass ply located in the sidewalls, of the tire and extends substantially between the tire beads and the tire breakers. For example, referring to FIG. 7A, the tire 700 of the present invention has a tire carcass 701, a tread portion 710, and a belt structure 712 between the tread portion 710 and the tire carcass 701. The tire carcass 701 includes a tire carcass reinforcement ply 720, a bead portion 706 having a bead 702, and a tire sidewall 714 generally extending between the tread portion 710 and the bead portion 706. The sidewall 714 has an inner surface 718 and an outer surface 719. The tire 700 outwardly appears like a "standard" off-the-shelf tire, such as a bias, bias/belted and radial tires, but is quite different in that the rubber matrix of the ply coating stock of the carcass reinforcement ply 720 is formed of a special material, discussed in more detail hereinafter, that selectively permits and restricts movement or reorientation of one or more reinforcement members (cords) 721 of the tire carcass reinforcement ply after the tire has been at least partially vulcanized or cured.

The carcass reinforcement ply 720 includes a plurality of tire reinforcing cords 721, which, in the case of a radial tire, are parallel and extend transversely from bead portion 706 to bead portion. The carcass reinforcement ply 720 has a central portion 720a and an end portion ("turn-up" end) 720b which wraps around a respective one of the beads 702 and extends radially (with respect to the tire) back towards the tread portion 710 of the tire 700. The reinforcement cords are selected from the group comprising Kevlar (TM), steel, rayon, and nylon.

For purposes of this discussion, three "landmarks" (points of interest) are noted on the carcass reinforcing member 720:

a point 720d adjacent the belt structure 712;

a point 720e at the radially-inwardmost point on the bead 702; and a point 720f at the end of the carcass reinforcing member 720.

The central portion 720a of the carcass reinforcing member 720 in the tire sidewall identified as 720g is defined as the portion of the reinforcing member between the point 720d and the radially-inwardmost point 720e on the bead 702. For purposes of the following discussion, the point 720d is considered relatively fixed with respect to the belt structure 712. The point 720e is relatively free to be manipulated to move (e.g., be displaced and/or slip) with respect to the bead 702.

When all of the reinforcing cords 721 in the section 720g have the same shape (curvature) and are of the same length as shown in FIG. 7A, the reinforcement cords in the tire carcass 701 have a substantially uniform tension and the tire 700 is assumed to have perfect uniformity characteristics. However, if the tire 700 is not perfectly uniform, we can assume that either the length or the curvature of the reinforcing cords 721 in the section 720g are not the same. For example, as shown in FIG. 7A, it might be possible to correct certain dimensional or dynamic non-uniformities of tire 700 by permanently reorienting the ply line of certain reinforcing cords 721 from their initial curvature (shown in solid line as 721) to a different ply line (shown in dashed line as 721'. The increased curvaceousness of cords 721' causes an increase in the tension of those cords as compared to the less curvaceous cords 721.

In another example, as shown in FIG. 7B, it might be possible to correct certain dimensional or dynamic non-uniformities of tire 700 by permanently reorienting or reshaping the ply line of certain reinforcing cords 721" from their initial curvature (shown in solid line as 721") to a straighter or less curvaceous ply line (shown in dashed line as 721'''). The decreased curvaceousness of cords 721''' causes a decrease in the tension of those cords relative to the more curvaceous cords 721".

Prior to the present invention, once a tire was at least partially cured in the tire mold, the conventional rubber did not allow for any permanent displacement or reorientation of the reinforcing cords with respect to each other or other tire components or material such as the beads or the sidewalls without permanently stretching the reinforcing cords beyond their elastic limit. Therefore, until the present invention, there was no known tire construction or method to change the length or curvature of the ply reinforcing cords 721 in portion 720g to adjust the cord tensions and thereby correct tire uniformity of an at least partially cured tire. According to the present invention, the matrix or ply coating stock of the carcass reinforcement ply 720 is formed with a material that selectively permits and restricts movement or reorientation of one or more reinforcement members (cords) of the tire carcass reinforcement ply with respect to other tire components after the tire has been at least partially vulcanized or cured. The matrix material is one that can be rendered plastic (deformable) and rendered non-plastic (nondeformable), which, in turn, respectively permits and restricts reorientation of one or more reinforcement cords 721 relative to other materials or components of the tire, after the tire has been at least partially vulcanized (cured), without permanently deforming (stretching) the one or more reinforcement members beyond their respective elastic limits. After the portions of one or more ply reinforcement members or cords are reoriented and permanently relocated, the material is rendered non-plastic to restrict further reorientation of the reinforcement members. The relocation or reorientation of the cords, as discussed below, results in a tire having improved uniformity characteristics compared to tires constructed using the prior art methods and constructions.

APPARATUS FOR CORRECTING TIRE UNIFORMITY

FIG. 8 illustrates a relevant portion of a post cure uniformity (PCU) apparatus 822 for mounting a tire 800 that is being corrected to improve one or more uniformity characteristics. The PCU apparatus 822 is provided for correcting, without grinding, one or more tire uniformity characteristics, such as, for example, radial force variation and radial runout. Only relevant portions of the apparatus are shown, for illustrative clarity. The PCU apparatus 822 includes a "split rim" 824 comprising two rim mounting halves 826a and 826b. The rim mounting halves 826a and 826b are substantially identical and include a frustroconical tire insert portion 828a, 828b, respectively, and a support base 830a, 830b, respectively, disposed at the outwardly facing side of the insert portion. A cylindrical bead seat 832a, 832b provided near the intersection of the frustroconical insert portions 828a, 828b and the support bases 830a, 830b is adapted to provide a seat and airtight seal in conjunction with the wall of the frustroconical insert portions for the bead portions 806a, 806b of the tire 800. A cylindrical induction coil 834a, 834b is preferably located in the support bases 830a, 830b, respectively, near the cylindrical bead seats 832a, 832b, respectively. The coils 834a, 834b are powered with electric AC current to inductively heat the beads 802a, 802b, respectively, when tire 800 is mounted on the PCU apparatus 822. Heat from the beads 802a, 802b conductively heats the material surrounding the beads. Since rubber is a poor heat conductor, the heat is relatively localized around beads 802a, 802b and does not extend up a sidewall 814. While the induction coils 834a, 834b are shown in the support bases 830a, 830b below the cylindrical bead seats 832a, 832b, it is also within the terms of the invention to locate the induction coils at any desired location in the rims mounting halves 826a,826b as long as they are capable of heating the beads 802a, 802b as needed. The rim mounting halves 826a and 826b are constructed of a non-electrically conductive material, such as plastic, so as not to interfere with the inductive field generated by the induction coils 834a, 834b. It is understood, that pressurized air can be provided into the cavity of the tire 800 through the split rim 824, such as through an air inlet passage 836, which, in turn, is connected to a source of pressurized air through air line 838.

The split rim 824 is mounted to a shaft (not shown) which rotates the two rim mounting halves 826a and 826b with a tire mounted thereon at a desired rate of rotation.

Adjacent to the split rim 824, there can be provided a rotatable shaft 833 typically held between two spaced bearing blocks 834 which are secured to a frame 835 (partially shown). The frame 835 can be moved towards or away from the wheel 800, by conventional means such as hydraulic actuators (not shown) to force the cylindrical peripheral surface 836 of the shaft 833 into a tread portion 810 to cause the tread portion to deflect radially inwardly an amount depending on the radial force applied by the shaft and the pressure within the tire 800. The peripheral shape of shaft 833 may have a generally cylindrical surface with any desired contour necessary to get the desired loading of different portions of the tire tread 810.

While the rotatable shaft 833 is shown disposed to engage the tread potion 810, it is also within the terms of the invention to dispose the shaft at a position to contact any annular or circumferential tire surface to obtain some advantage of the present invention.

In operation, a tire to be corrected is delivered to the PCU apparatus 822 by conventional means such as a conveyor belt (not shown). The tire can be positioned between the two rim mounting halves 826a and 826b which are initially spaced axially apart from each other. Then by conventional means, such as hydraulic actuators (not shown), the two rim mounting halves 826a and 826b are moved toward each other so that the lower rim mounting half 826b is brought into axial engagement with the lower bead area 806b and the upper rim mounting half 826a is brought into axial engagement with the upper bead area 806a. The tire 800 is then inflated with fluid pressure, such as air, to a pressure sufficient to seat the bead areas 806a and 806b against the rim mounting halves 826a and 826b.

METHODS OF CORRECTING TIRE UNIFORMITY

In the preferred embodiment, as shown in FIG. 8, the tire 800 has a carcass ply 820 where reinforcement cords 821 are disposed in a matrix of special ply coating material— "special" in that it selectively permits and restricts movement, relocation or reorientation of one or more reinforcement members (cords) of the tire carcass reinforcement ply after the tire has been at least partially vulcanized or cured. For example, the special material can be a thermoplastic material that exhibits plastic (malleable, flowable, deformable) mechanical properties when its temperature is at least its "deflection" or melting temperature, 250 degrees Fahrenheit (121 degrees C.) to 375 degrees Fahrenheit (190 degrees C.) and exhibits nonplastic mechanical properties when its temperature is below the deflection temperature. An important aspect of a suitable thermoplastic material is that it is co-curable with the surrounding rubber materials. That is, it can cross-bond at its interface with the vulcanized rubber while exhibiting its plastic properties in the rest of its volume when it is above the deflection temperature. Also, the special material must be mechanically capable of operating under the demanding conditions of an automobile or truck tire.

STILL IN THE TIRE MOLD

The entire time the tire 800 with the carcass ply 820 of reinforcement cords 821 disposed in a matrix of special ply coating material is still in the tire mold (not shown), the reinforcement cords in the carcass ply remain unrestricted, because the special ply coating material remains in a plastic or deformable state. This latter state or condition allows the cords 821 to adjust themselves throughout the curing process in the tire mold so that they tend to have an equal tension when the tire is removed from the mold. In the prior art, this was not possible, because the tire's rubber components vulcanize in the tire mold at different rates and different portions of the cords would "lock up" (become fixed or immovable) at different times in the process, and so would not lock up uniformly with respect to each other.

JUST OUT OF THE TIRE MOLD

When the tire 800, having a carcass ply 820 with the reinforcement cords 821 disposed in a matrix of the special ply coating, is initially removed from the tire mold and is still hot and above its deflection temperature, i.e. about 121 degrees C. to about 190 degrees is C., the tire can be mounted onto a PCU apparatus 822, as shown in FIG. 8, as described herein before. Then, the tire 800 is inflated to a pressure sufficient to seat the bead areas 806a and 806b against the bead seats 832a and 832b, respectively. The tire 800 can be inflated to a pressure that does not cause any of the tire components to delaminate or otherwise become defective. The inflation of the tire 800 while still hot from the molding process causes the cords 821, which are embedded in the special ply coating material that remains in a plastic, deformable, malleable state, to adjust themselves to tend to achieve an equal tension. The cords 821 can adjust themselves by changing their curvaceousness, as shown in FIGS. 7A and 7B and described with regards to cords 721' and 721" hereinbefore. This simple method of inflating a tire 800 having reinforcement cords 821 disposed in a matrix of the special ply coating is believed to be, in some cases, sufficient to adjust the ply reinforcement cords of the tire to improve a tire uniformity characteristic.

In some cases, it may be advantageous to force the cylindrical peripheral surface 836 of the shaft 833 into the tread 810 to cause the tread portion to deflect radially inwardly an amount depending on the radial force applied by the shaft and the pressure within the tire 800. Then the tire and the split rim 824 of the PCU apparatus 822 can be rotated at a desired speed. The effect is to reorient the cords 821 by alternatively stretching and relaxing the cords, while they are still able to move while the matrix of special ply coating material is hot and remains plastic, so that the stresses in the cords are made generally uniform while the majority of the rubber in the tire is already at least partially cured even after some or all of the other rubber components have cured.

As the tire 800 begins to cool down after it is initially removed from the tire mold, it may be beneficial or necessary to heat the beads 802a and 802b of the tire 800 with the induction heating coils 834a and 834b. This additional heat may allow for some self-adjustment of the shape of the ply cords 821 in the sidewalls 814, as previously discussed herein, and/or lengthening of the portion of the ply cord portion in the sidewalls by pulling the ply cords closer to the bead 802a, 802b and thereby compressing the ply coating material between the carcass ply 820 and beads 802a, 802b. Alternately, the reorienting of the one or more reinforcement members includes slipping the one or more reinforcement members around beads 802a, 802b.

With regard to any of the tire embodiments incorporating thermoplastic portions, it should be understood that a wide variety of thermoplastic materials are known, the properties of which are readily selected to tailor the properties of the resulting tire, as desired in a given application. For example, it would generally be desirable to select a formulation for a thermoplastic material which has a deflection temperature which is higher than the highest expected temperature of the bead portion of the tire, so that the carcass reinforcing member may be manipulated to move (e.g., be displaced) with respect to the bead only when desired, and at other times (e.g., during driving the vehicle) remains fixed with respect to the bead.

In a variation of the present invention, heat might be applied to a localized region of an unvulcanized tire, below its vulcanization temperature, immediately prior to vulcanizing of the tire in a mold, to relieve localized or nonuniform cord stress. For the same reason, the green might be heated in the mold for a short period of time before pressure is applied.

The thermoplastic materials for use in this invention can be sulfur vulcanizable (i.e. diene-based) or semi-sulfur vulcanizable (having a limited number of sulfur vulcanizable sites) or non sulfur vulcanizable. Two or more different thermoplastic materials may be mixed together or disposed in or near each other in the same tire region. Also, two or more different thermoplastic materials may be used in different tire regions. The deflection temperature is in the range of 30 degrees C. to 190 degrees C. and preferably in the range of 121 degrees C. to 190 degrees C.

An example of a sulfur vulcanizable thermoplastic for use with this invention is a syndiotactic 1,2-polybutadiene (SPBD) that normally has more than 65% of its monomeric units in a syndiotactic 1,2-configuration, as described in U.S. Patent No. 5,058,647, which is incorporated in its entirety by reference herein. A related reference is U.S. Patent No. 4,790,365, incorporated in its entirety by reference herein. Another sulfur vulcanizable thermoplastic for use with this invention is a trans-polyoctenamer. These elastomers can be used alone or as a mixture with other diene-based elastomers and/or resins which are hereinafter described.

Semi-sulfur curable resins might be AB and ABA block copolymers, where A represents blocks of polystyrene, poly (alphamethyl styrene) or poly(t-butylstyrene), and B represents blocks of either polyisoprene or polybutadiene. Such block co-polymers may be, for example, SBS or SIS block copolymers, as described in U.S. Patent No. 5,756,589, incorporated in its entirety by reference herein. Semi-sulfur curable resins would normally be used in a mixture with sulfur curable diene-based elastomers, such as in a range of 5–95 phr and preferably 10–40 phr of the resin in the elastomer(s).

Non-curable resins for use with this invention might be polymers of alphaolefins such as polyethylene, polypropylene, polybutene and copolymers of alphaolefins with minor amounts of other mono-olefins such as 1-hexene and 1-octene. Other non-curable resins might be hydrocarbon, phenol/acetylene and rosin derived resins. Such resins are described in U.S. Patent No. 5,901,863, incorporated in its entirety by reference herein. Non-curable resins might be used as a blend in mixtures of conjugated diene based sulfur curable elastomers in the amount of, for example, 5–25 phr.

While the invention has been described in combination with embodiments thereof, it is evident that many alternative modifications, and variations will be apparent to those skilled in the art in light of the foregoing teachings. Accordingly, the invention is intended to embrace all such modifications and variations as fall within the scope of the appended claims.

What is claimed is:

1. A method of manufacturing a pneumatic tire having a having a pair of spaced beads and at least one carcass reinforcement ply extending between the beads for improving one or more tire uniformity characteristics, the method being characterized by the steps of:
   a) forming the at least one carcass reinforcement ply of a plurality of reinforcement cords embedded in a matrix material that can be rendered plastic and rendered non-plastic, which respectively permits and restricts reorientation of reinforcement cords relative to other materials or components of the tire after the tire has been at least partially vulcanized;
   b) rendering the matrix material plastic, after the tire has been substantially completely vulcanized, to permit one or more reinforcement cords to be reoriented;
   c) reorienting one or more reinforcement cords with respect to other reinforcement cords or components; and
   d) rendering the matrix material non-plastic, to restrict further reorientation of adjacent reinforcement cords.

2. Method, according to claim 1, wherein:
   the step of reorienting the one or more reinforcement cords includes reorienting the cords without their being stretched beyond their elastic limits.

3. Method, according to claim 1, further characterized by the step of:
   selecting the matrix material to be a thermoplastic having a deflection temperature; and
   the step of rendering the matrix material plastic includes the step of maintaining the matrix material to above the deflection temperature; and wherein
   the step of rendering the matrix material non-plastic includes the step of cooling the matrix material to below the deflection temperature.

4. Method, according to claim 3, wherein the step of maintaining the matrix material to above the deflection temperature includes:
   the tire being still hot from the tire mold and above the deflection temperature.

5. Method according to claim 3, wherein the step of rendering the matrix material plastic includes heating the tire in a mold to above the deflection temperature to permit reorientation of the one or more reinforcement cords while within the mold and the step of reorienting the one or more reinforcement cords includes the step of applying a force for moving the one or more reinforcement cords by air pressure after removal from the tire mold.

6. Method, according to claim 5, wherein the step of reorienting the one or more reinforcement cords further includes the step of applying a force to the tread of the tire after removal from the tire mold.

7. Method, according to claim 3, wherein:
   the matrix material is a thermoplastic material that selectively permits movement of the one or more reinforcement cords in response to being heated to the deflection temperature of at least 30 degrees C.

8. Method, according to claim 4, wherein:

the matrix material is a thermoplastic material having a deflection temperature of between 121 degrees C. and 190 degrees C.

9. A method of manufacturing a pneumatic tire having a having a pair of spaced beads and at least one carcass reinforcement ply extending between the beads for improving one or more tire uniformity characteristics, the method being characterized by the steps of:

a) forming the at least one carcass reinforcement ply of a plurality of reinforcement cords embedded in a matrix material that can be rendered plastic and rendered non-plastic, which respectively permits and restricts reorientation of reinforcement cords relative to other materials or components of the tire after the tire has been at least partially vulcanized;
 b) rendering the matrix material plastic, after the tire has been at least partially vulcanized , to permit one or more reinforcement cords to be reoriented;
 c) reorienting one or more reinforcement cords with respect to other reinforcement cords or components;
 d) rendering the matrix material non-plastic, to restrict further reorientation of adjacent reinforcement cords;
 e) selecting the matrix material to be a thermoplastic having a deflection temperature; and
  the step of rendering the matrix material plastic includes the step of maintaining the matrix material to above the deflection temperature; and wherein
  the step of rendering the matrix material non-plastic includes the step of cooling the matrix material to below the deflection temperature; and
  wherein the step of rendering the matrix material plastic includes:
   heating only selected portions of the tire to above the deflection temperature to permit reorientation of the one or more reinforcement cords.

10. A method of manufacturing a pneumatic tire having a having a pair of spaced beads and at least one carcass reinforcement ply extending between the beads for improving one or more tire uniformity characteristics, the method being characterized by the steps of:

a) forming the at least one carcass reinforcement ply of a plurality of reinforcement cords embedded in a matrix material that can be rendered plastic and rendered non-plastic, which respectively permits and restricts reorientation of reinforcement cords relative to other materials or components of the tire after the tire has been substantially completely vulcanized;
 b) rendering the matrix material plastic, after the tire has been at least partially vulcanized, to permit one or more reinforcement cords to be reoriented;
 c) reorienting one or more reinforcement cords with respect to other reinforcement cords or components;
 d) rendering the matrix material non-plastic, to restrict further reorientation of adjacent reinforcement cords;
 e) selecting the matrix material to be a thermoplastic having a deflection temperature; and
  the step of rendering the matrix material plastic includes the step of maintaining the matrix material to above the deflection temperature; and wherein
  the step of rendering the matrix material non-plastic includes the step of cooling the matrix material to below the deflection temperature; and wherein the step of rendering the matrix material plastic includes:
   heating the tire in a tire mold to above the deflection temperature to permit reorientation of the one or more reinforcement cords while within the mold.

11. Method, according to claim 10, wherein the step of reorienting the one or more reinforcement cords further includes the step of applying a force to the tread of the tire after removal from the tire mold.

* * * * *